United States Patent Office 3,039,507
Patented June 19, 1962

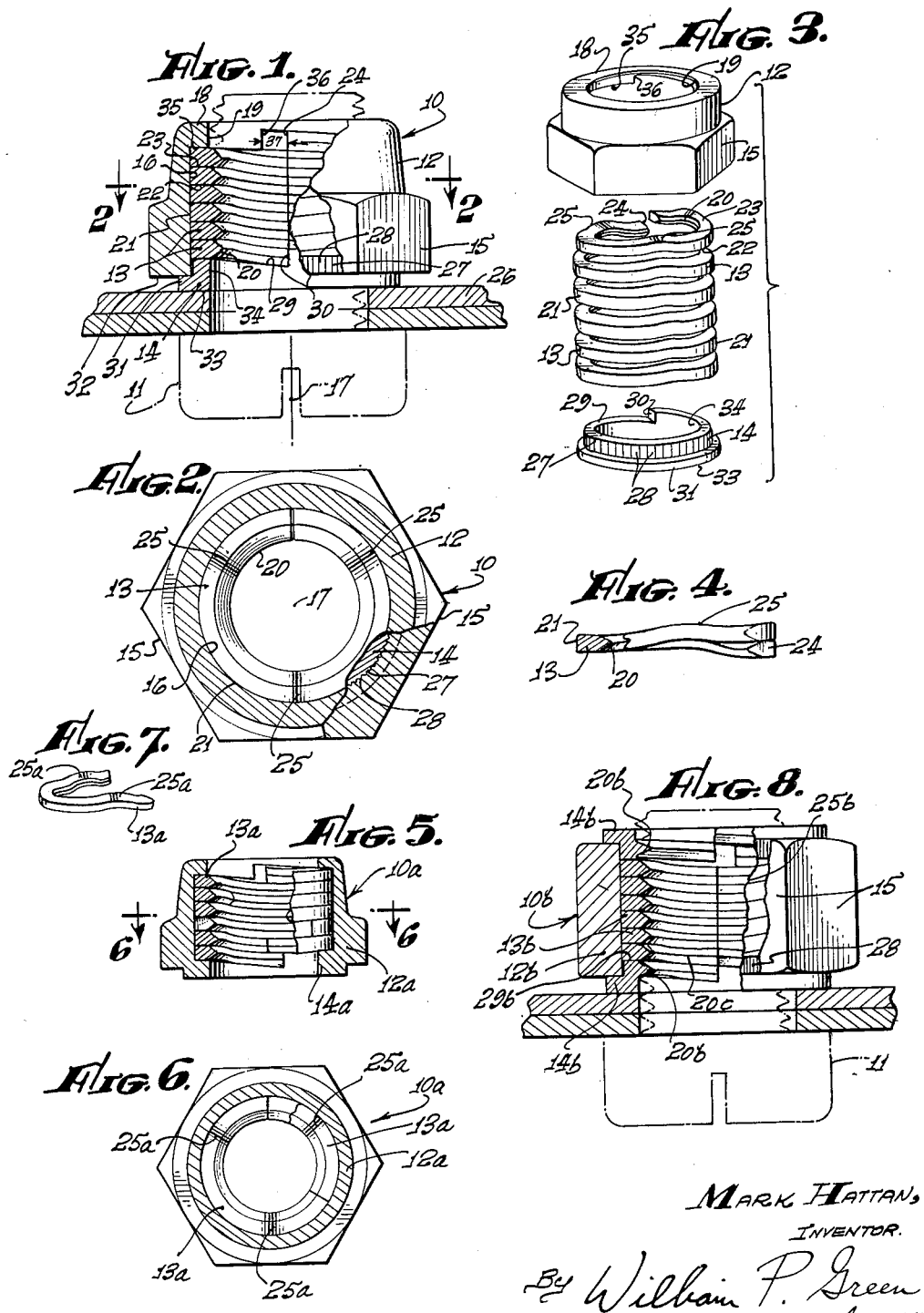

3,039,507
LOCK NUT HAVING SEGMENTED THREAD STRUCTURE
Mark Hattan, 1043 S. Euclid, Pasadena, Calif., assignor of six percent to William P. Green, San Marino, Calif.
Filed Aug. 19, 1957, Ser. No. 678,778
2 Claims. (Cl. 151—14)

This invention relates to improved threaded nuts of a self-locking type capable of tightly gripping a coacting threaded stud, in a manner positively preventing accidental unscrewing of the parts.

In several prior patents issued to the inventor of the present application, specifically Patents Numbers 2,464,808 issued March 22, 1949, 2,402,159 issued June 18, 1946, and 2,497,081 issued February 14, 1960, there has been disclosed a unique type of lock nut which had had certain definite advantages over prior lock nut structures. This nut of my prior patents has consisted of an outer hollow tubular body containing an elongated helically coiled resilient spring element forming within the body a thread structure into which a stud can be screwed. To attain the desired self-locking action, the coiled spring element is so shaped as to have small wave shaped deformations at different locations along its length, which waves must be resiliently deformed back toward a true helical configuration as the stud and nut are screwed together, to thus exert a continuing frictional force against the stud threads acting to very effectively lock the nut and stud against unscrewing relative rotation.

The present invention has to do with certain improvements in the above discussed type of lock nut. For one thing, these improvements result in a nut whose parts are so designed and interrelated as to be inherently capable of formation with very precise accuracy, so that the self-locking capacity of a nut may be precisely predetermined, and be maintained extremely uniform for a large number of nuts of the same construction. Thus, the exact amount of locking action which is desired for any particular use may be pre-built into a nut with accuracy, to require a predetermined desired torque for overcoming the locking action to loosen the nut.

Such accurate predetermination of the locking effect is attained in large part by an arrangement which allows for greatly increased accuracy in the formation of the locking waves in the thread structure. Specifically, this accuracy is achieved by substituting for the single helically coiled thread element a series of several separately formed thread elements which are assembled together in the nut body in a manner such that the different elements act as helical continuations of one another. That is, these various separate elements form different portions respectively of the stud engaging thread. Each of the elements is preformed to have one or more locking waves, whose dimensions can be much more accurately predetermined than where a multi-turn single element is used. The individual elements can be designed to each form not more than about one complete turn of the helical thread structure, so that a coining or forging operation may be employed to form the individual helical elements very precisely and with accurate control of their wave shape. Whereas it might appear at first blush that such a group of separate single turn elements could not have any effective locking action whatsoever, it actually happens in practice that this type of composite assembly does have an extremely positive and reliable locking effect.

In the lock nuts of my prior mentioned patents, the thread structure is held in the outer body by shoulders provided at the opposite ends of the body. These shoulders preferably include first shoulders holding the thread structure against rotation relative to the body, and also a pair of helical ramps against which the opposite ends of the thread structure bear axially. A further feature of the present invention resides in a preferred manner of forming these shoulders at one or both ends of the body, and particularly at its load bearing end. Specifically, I form the shoulders at the load bearing end on a separate part whose opposite axial sides engage respectively the thread structure and a work piece against which the nut is tightened. This base part then transmits axial force directly from the threads to the work piece, without the necessity for transmission of the force through the body of the device, which body may then be relatively thin and light as compared with the load bearing part.

The base part has a portion which projects into the tubular body and is a pressed fit therein, to secure the parts together without any special fastening means. To prevent rotation of the end part relative to the body, one of the two interengaging pressed fit surfaces on the body and the end part is serrated or otherwise irregularized to non-circular form, to effectively grip the other surface and rotatively key the parts together. A second separate part may be employed at the opposite end of the nut body, to form the thread retaining shoulders at that end.

The above and other features and objects of the present invention will be better understood from the following detailed description of the typical embodiments illustrated in the accompanying drawing, in which:

FIG. 1 is a view, partially in section and partially in elevation, of a first form of lock nut embodying the invention;

FIG. 2 is a transverse section taken on line 2—2 of FIG. 1;

FIG. 3 is an exploded perspective view of the FIG. 1 nut;

FIG. 4 is a side elevational view, partially broken away, of one of the thread elements of the nut;

FIG. 5 is a view similar to FIG. 1, but showing a variational form of the invention;

FIG. 6 is a section taken on line 6—6 of FIG. 5;

FIG. 7 is a perspective view of one of the thread elements of the FIGS. 5 and 6 nut; and FIG. 8 is a view of a final form of the invention.

Referring first to FIGS. 1 to 4, I have shown at 10 a composite lock nut structure formed in accordance with the invention, and adapted to threadedly engage a coacting threaded stud represented at 11. The nut 10 includes an outer essentially tubular body 12, a series of several (typically 6) thread elements 13 within the body, and a base part 14 engaging a lower one of the thread elements. The body has a non-circular outer surface 15 of polygonal configuration, for engaging a wrench or other tool to be used in turning the nut relative to stud 11. This surface 15 of the nut has typically been shown in the drawing as being hexagonal in shape.

Internally, the nut body 12 has an inner cylindrical surface 16 extending along almost the entire axial extent of the body, and centered about main axis 17 of the nut. At its upper end (as viewed in FIG. 1), the body has an integral generally annular flange portion 18 turned radially inwardly to retain elements 13 against upward removal from the body. This flange terminates inwardly in an inner typically cylindrical surface 19 centered about axis 17 and of a diameter great enough to pass stud 11.

The elongated elements 13 may all be identical, and are of essentially helically curving configuration, each element 13 having a uniform transverse section along its entire helical extent (section shown in FIG. 1). In FIGS. 1 to 4, each of these elements has a helical extent of substantially exactly 360 circular degrees. The radially inner portions 20 of elements 13 project inwardly beyond the diameter of surface 19, and are of V-shaped cross section to function as threads for engaging the threads of stud 11. The radially outer surfaces 21 of elements 13 are cylindrical and of a diameter corresponding to that of body surface 16, to bear radially outwardly against that surface. Radially between the inner thread shaped portion of each element 13 and the location of its outer surface 21, the element has a pair of parallel surfaces 22 and 23 facing in opposite axial directions and extending directly radially outwardly with respect to axis 17. The surfaces 22 and 23 of adjacent elements 13 engage axially against one another. The normal helical curvature of the thread elements may be at a pitch corresponding to the axial thickness of the individual elements, so that when the elements 13 are assembled together in the body as seen in FIG. 1, their portions 20 form continuations of one another, and form together an internal thread into which the stud may be screwed.

The opposite ends of each of the elements 13 terminate in planar end faces 24 which may extend directly transversely of the length of the element 13. These surfaces 24 of all of the elements 13 may lie in a common plane extending axially of the nut and containing axis 17. The elements 13 are of resiliently deformable spring steel or other metal.

The self-locking action of the nut is attained by forming each of the elements 13 to have a slight axially waving configuration at one or more (say three) evenly circularly spaced locations 25. That is, at each of these locations 25 there is added to the basic helical curvature of element 13 a slight axially waving curvature, in the normal condition to which the element tends to return by its own resilience. The waves 25 of the various elements 13 are positioned at identical locations, so that the waves of adjacent elements are in axial alignment and accurately nest axially within one another. Preferably, the waves 25 are deformed axially away from the base part 14, which engages a work piece 26 when the stud and nut are tightened.

Base part 14 is essentially annular, and has an essentially annular portion 27 which projects axially into the end of inner cylindrical surface 16 of body 12. This portion 27 is a tight pressed fit in surface 16 of the body, and has external irregularities 28, which may take the form of axially extending ridges or serrations for biting into the metal of body surface 16 to positively secure the part 14 against rotary movement relative to body 12 after part 14 has been driven into its FIG. 1 position relative to the body. The upper surface 29 of part 14 (as viewed in FIG. 1) is engaged by surface 22 of the lowermost element 13, and has a helical curvature corresponding to the basic helical curvature of surface 22. However, surface 29 does not have waves corresponding to waves 25 of elements 15, but instead continues its true helical curvature at the locations of waves 25. Surface 29 faces directly axially, and continues through 360 circular degrees. The opposite ends of surface 29 are joined together by an axially extending shoulder 30 against which end face 24 of the lowermost element 13 can abut to limit rotation of elements 13, in one direction, relative to parts 12 and 14. As in the case of surfaces 24, shoulder 30 may lie in a plane which contains axis 17.

Beneath or axially beyond body 12, part 14 has an annular increased diameter flange 31 which bears upwardly against transverse undersurface 32 of the body. The bottom annular surface 33 of part 14 extends directly transversely of axis 17 and bears downwardly against the work piece 26 when the nut is tightened, so that all of the forces from elements 13 to the work piece are transmitted directly through part 14. For this reason, part 14 is desirably formed of a very strong and hard high quality material, such as steel or other metal, or a high strength plastic or ceramic; while body 12 may be formed of a softer, more ductile and/or lighter material. Radially inner surface 34 of part 14 may be cylindrical and of a diameter corresponding to surface 19. The upper flange 18 of body 12 preferably has a downwardly facing surface 35 forming a helical ramp similar to surface 29 on part 14 for engaging surface 23 of the uppermost element 13. A shoulder 36, corresponding to lower shoulder 30, engages the end face 24 of the uppermost element 13, to transmit rotation thereto from the body. As seen clearly in FIG. 1, shoulders 30 and 36 are so positioned as to allow somewhat more space than is required for the combined helical extent of all of the elements 13 (as represented by gap 37 in FIG. 1), so that elements 13 are free for some very limited shifting movement helically relative to body 12.

To now describe the use of the nut 10, as the nut is screwed onto the stud or screw 11, the interengagement of the stud threads with elements 13 of the nut deforms the waves 25 of elements 13 toward a true helical curvature corresponding to that of the stud threads. Since waves 25 tend to return by their own resilience to their normal waved condition, they resiliently bear tightly against the threads of the stud, and in this way attain a highly effective self-locking action. This locking action is predeterminable, permanent, and is not destroyed by repeated screwing of the nut onto and off of the stud. When waves 25 are deformed toward a true helical curvature, such deformation tends to slightly elongate elements 13. The gap or looseness 37 in FIG. 1 is purposely made of sufficient size to allow for this elongation of elements 13. When the nut is tightened against work piece 26, the lowermost element 13 is pulled tightly into engagement with surface 29 of part 14, the next successive element 13 is pulled tightly into engagement with surfaces 23 and 24 of the first element 13, and similarly each of the upper elements 13 is pulled tightly against surfaces 23 and 24 of the next lower element.

FIGS. 5 to 7 show a variational form of nut 10a which is identical with that of FIGS. 1 to 4 except in the following respects. For one thing, the nut body 12a in FIGS. 5 to 7 has a lower portion 14a which is integral with body 12a and serves the function of part 14 in FIGS. 1 to 4. Without discussing portion 14a in detail, it will suffice to state merely that this portion has surfaces shaped the same as, and serving the purposes of, surfaces 29, 30, 33 and 34 of part 14.

The thread elements 13a of FIGS. 5 to 7 are the same as elements 13 except that elements 13a extend through less than a complete turn, typically through exactly two-thirds of one turn. Each element 13a may then have only two of the waves 25a, but with the waves spaced uniformly so that the waves of the various elements 13a will nest together and form three sets of evenly circularly spaced waves, the waves of each set being exactly aligned axially and nesting axially together. One advantage of the FIGS. 5 to 7 arrangement is that the points at which surfaces 24 of successive elements 13a engage are staggered about the nut, rather than all being aligned as in FIG. 1.

FIG. 8 shows a final form of the invention which is the same as the FIG. 1 form except that two of the base parts 14b are forced into opposite ends of the body 12b, so that the body may be formed very easily and inexpensively of simple tubular stock having an externally polygonal (preferably hexagonal) wrench engaging surface 15. The parts 14b have the same configuration as part 14 of FIG. 1, except that each part 14b forms at its inner side a radially inwardly projecting helical thread 20b, shaped in correspondence with and of a pitch corresponding to threads 20c of elements 13b. These thread portions 20b are positioned to form continuations of the thread portions of elements 13b, and each of the threads 20b is preferably exactly one full 360° turn. As will be apparent, threads 13b follow helically along the inner sides of ramp surfaces 29b.

The thread portions 20b of parts 14b serve several highly desirable functions. In the first place, the meshing of screw or stud 11 with threads 20b and 20a positively holds parts 14b against axial movement out of body 12b (since serrations 28 prevent rotation of parts 14b relative to body 12b). Also, the threads of parts 14b increase the holding effectiveness of the nut since they increase the number of thread turns which engage and hold the screw. Further, the true helical thread turns 14b, which have no waves such as waves 25b of elements 13b, provide two opposite end turns of the nut which can easily be initially screwed by hand onto the stud.

It will of course be understood that, instead of forcing parts 14 and 14b into their respective nut bodies, these parts may instead be assembled together by chilling the part 14 or 14b and/or heating the body, to form a shrink fit. Consequently, in the claims, the term "tight frictional fit" is used to cover both a pressed fit and such a shrink fit.

If it is desired in a particular instance, the elements 13 of FIG. 1, or elements 13b of FIG. 8, may be formed as a single one-piece multi-turn coiled member, instead of as a number of separate elements as shown. In this case, some but not all of the advantages of the invention will be attained. The construction of these further variations of the invention, using one piece thread elements, will of course be completely obvious without the necessity for illustration.

I claim:

1. A lock nut comprising an outer tubular hollow body into which a threaded stud may project and having a cylindrical inner surface, a series of identical separately formed helical thread elements confined in said body and forming together an elongated helically extending thread into which said stud may be screwed, the individual ones of said separately formed elements forming successive portions of said thread, successive ones of said elements having ends abutting circularly against one another to transmit forces therebetween, successive ones of said elements being in engagement axially against one another to transmit forces therebetween, all of said elements being free for limited rotary shifting movement relative to said body, retaining means for holding said elements in the body and forming a pair of shoulders at opposite ends of said series of elements engageable with the outer ends of the end ones of said elements in a relation limiting said rotary shifting movement, said retaining means forming at one end of the body a helical ramp against which an end one of said elements bears axially, said different elements having radially outer surfaces which are cylindrical and are aligned axially with one another and are engageable with said inner cylindrical surface of the body but are slidably movable therealong upon said rotary shifting movement of the elements relative to the body, said different helical elements having essentially similar waves at substantially corresponding locations about their circular extents in addition to their helical curvature and which nest axially into one another and provide a locking action with the stud, said elements having circular extents substantially less than 360 degrees, with the abutting ends of different pairs of successive elements engaging at different points about the axis of the nut.

2. A lock nut for threadedly engaging a coacting stud and adapted to bear axially against a work piece when the nut and stud are tightened relative to one another; said nut comprising a hollow essentially tubular outer body, an elongated helically coiled thread structure of resilient spring material within said body having an inner portion forming an essentially helical internal thread adapted to threadedly engage said coacting stud, said resilient coiled thread structure having portions which are normally shaped to have a waving configuration in addition to their helical curvature and as they extend helically to thereby have a self-locking action with the stud, said coiled thread structure having a radially outwardly facing surface bearing outwardly against a radially inwardly facing surface of said body and free for slight shifting movement relative thereto so that the thread structure may shift slightly in mating with and conforming to the stud, and retaining means holding the thread structure in said body and limiting said shifting movement thereof relative to the body, said retaining means including an end element formed separately from said outer body and attached to an end thereof, said end element having an axially inwardly facing surface forming a helical ramp against which said thread structure bears axially toward said work piece upon relative tightening of the stud and nut, said end element having an axially outer surface positioned to bear axially against said work piece when the nut is tightened thereagainst, said end element forming a shoulder engageable with an end of said thread structure and limiting relative turning movement of the thread structure relative to said end element, said end element having a radially inner portion forming a thread of substantially true helical configuration which is essentially a continuation of the thread formed by said coiled structure and therefore meshes with the stud as the nut and stud are screwed together, means holding said end element against rotation relative to the body and including a radially outwardly facing surface on said end element which engages and is a tight frictional fit in a radially inwardly facing surface of the body, one of said two last mentioned engaging frictional fit surfaces being of irregularized non-circular cross-sectional configuration to positively hold said body and said end element against relative rotation, a second separately formed end element at the opposite end of said body and having a helical ramp engaging said thread structure, said thread structure comprising a plurality of separately formed thread elements confined in said body and forming together an elongated helically extending thread into which the stud may be screwed, the individual ones of said separately formed thread elements forming successive portions of said thread and each having a helical extent not greater than about 360 circular degrees, successive ones of said thread elements having ends abutting circularly against one another and having said waving configuration at substantially corresponding locations about their circular extents.

References Cited in the file of this patent

UNITED STATES PATENTS

| 2,386,197 | Dawson | Oct. 9, 1945 |
| 2,407,879 | Haas | Sept. 17, 1946 |
| 2,464,808 | Hattan | Mar. 22, 1949 |
| 2,540,759 | Schneider | Feb. 6, 1951 |
| 2,550,867 | Rosan | May 1, 1951 |
| 2,775,281 | Smith | Dec. 25, 1956 |
| 2,794,475 | Pachmayr | June 4, 1957 |

FOREIGN PATENTS

| 52,667 | Austria | Mar. 11, 1912 |
| 595,082 | Great Britain | Nov. 6, 1947 |
| 999,451 | France | Oct. 3, 1951 |